July 11, 1939. F. E. CLEMONS Re. 21,142

INDEPENDENT WHEEL SUSPENSION

Original Filed Aug. 11, 1934 2 Sheets-Sheet 1

INVENTOR.
FREDERICK E. CLEMONS.
BY
Lockwood Goldsmith & Gatt
ATTORNEYS.

July 11, 1939. F. E. CLEMONS Re. 21,142

INDEPENDENT WHEEL SUSPENSION

Original Filed Aug. 11, 1934 2 Sheets-Sheet 2

INVENTOR.
FREDERICK E. CLEMONS.

BY Lockwood Goldsmith & Gatt
ATTORNEYS.

Reissued July 11, 1939 Re. 21,142

UNITED STATES PATENT OFFICE 21,142

INDEPENDENT WHEEL SUSPENSION

Frederick E. Clemons, Indianapolis, Ind.

Original No. 2,104,736, dated January 11, 1938, Serial No. 739,370, August 11, 1934. Application for reissue February 21, 1938, Serial No. 191,811

21 Claims. (Cl. 280—124)

This invention relates to motor vehicles and is primarily directed to independent wheel suspension and adjustable camber.

The chief object of this invention is to provide a motor vehicle driving and/or steering wheel with a relatively independent mounting, whereby camber of the wheel may be readily adjusted and retained in adjusted position and the wheel at the same time may be relatively independently mounted with respect to the axially aligned wheel, permitting independent wheel action, that is, movement of each wheel independent of the other and the frame in an up and down direction.

The chief feature of the invention consists in the accomplishment of the foregoing objects.

A further feature of the invention consists in the application thereof to a lever arm type support for the wheel which is relatively independent of the other wheels and which is associated with a spring carried by the frame.

The full nature of the invention will be understood from the accompanying drawings and the following description and claims:

In the drawings, Fig. 1 is a top plan view of one embodiment of the invention showing the same applied to the forward steering wheels and the rearward driving wheels.

Figure 1:
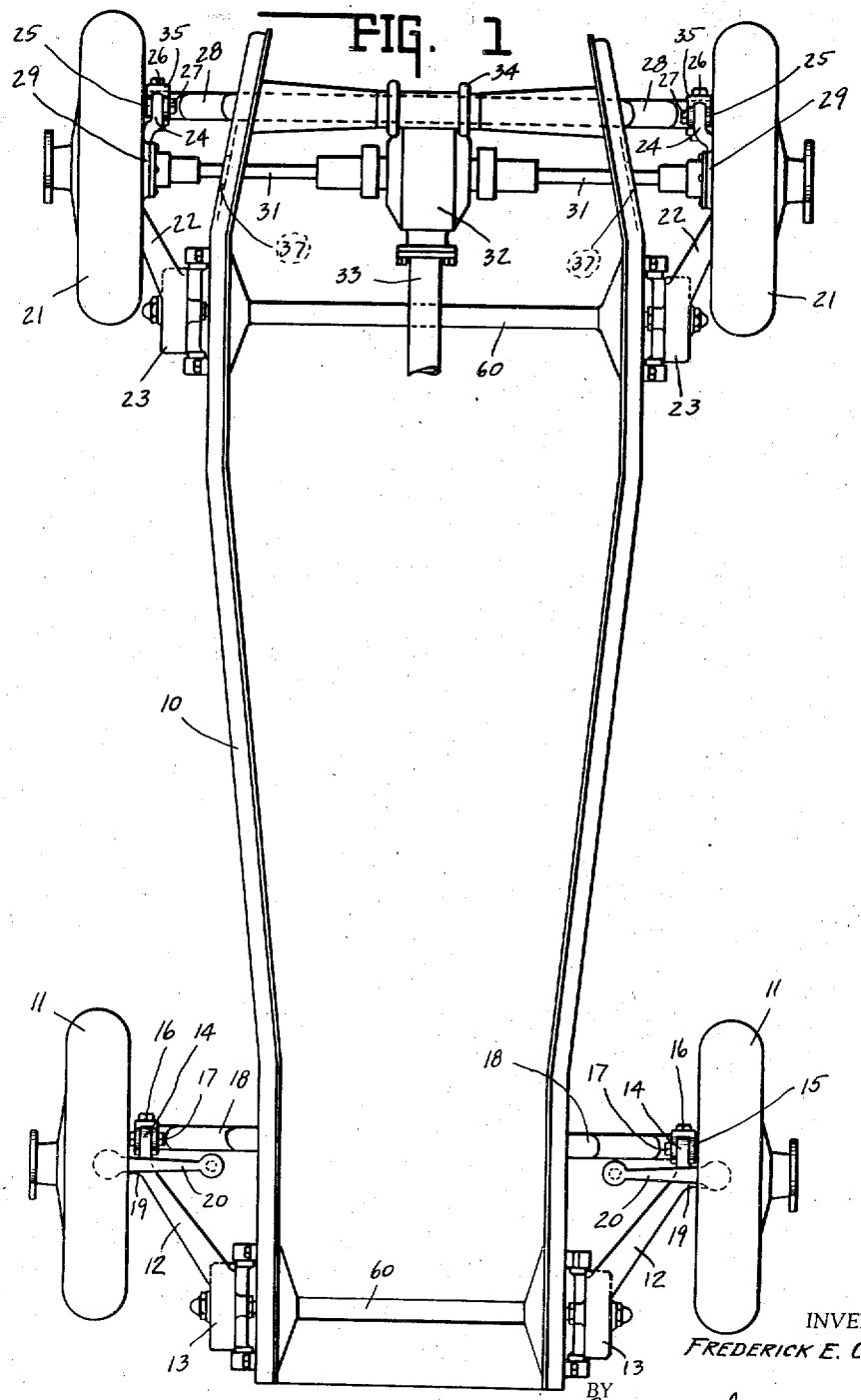

In the drawings, 10 indicates generally a frame structure upon which the body of a motor vehicle and the engine are mounted, both of the latter being omitted for clearness. 11 indicates a pair of axially aligned steering and forward wheels. Each wheel is rotatably supported upon a portion of a lever arm 12 which terminates in a support portion 13 at one end. The opposite end of the lever 12 is indicated at 14 and by means of a pair of links 15 that are arranged about two transverse axes 16 and 17, is connected to one end of a transverse spring 18. A single transverse spring may extend across the frame or the same may consist of longitudinally aligned spring portions suitably secured to the frame and transverse to the longitudinal axis of the frame.

It is to be understood that while the frame has been indicated by the numeral 10, the invention can be applied and associated with a combined frame and body in which the frame is not a distinct element, separate and apart from the body.

Each lever 12 in the present form of the invention, is shown supporting the associated steering wheel in trailing relation relative to the axis of the pivotal support of the lever upon the frame. The spindle for each front wheel is not illustrated in detail but is carried by the usual king-pin construction and the king-pin in turn is supported by the projecting portion 19 of the lever. Associated with the spindle is an arm 20 by which the steering wheel is controlled for directional movement of the vehicle.

Figure 4:
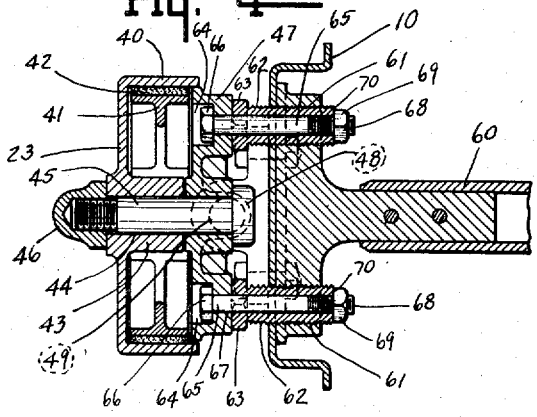
Fig. 4 is a sectional view taken on line 4—4 of Fig. 2 and in the direction of the arrows.

The supported portion 13 of the lever arm is suitably and adjustably carried by the frame, as illustrated clearly in Fig. 4, and to which reference will be had hereinafter when discussing camber.

Figure 2:
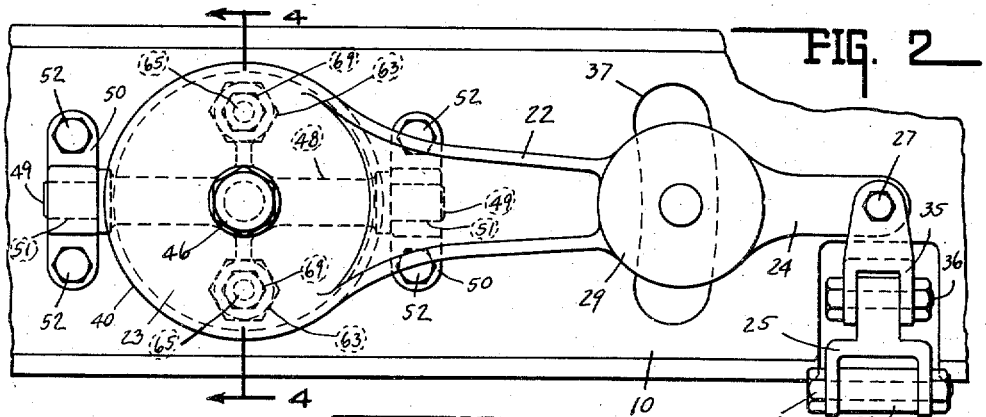
Fig. 2 is an enlarged side elevation of the driving wheel and lever type mounting.
Figure 3:
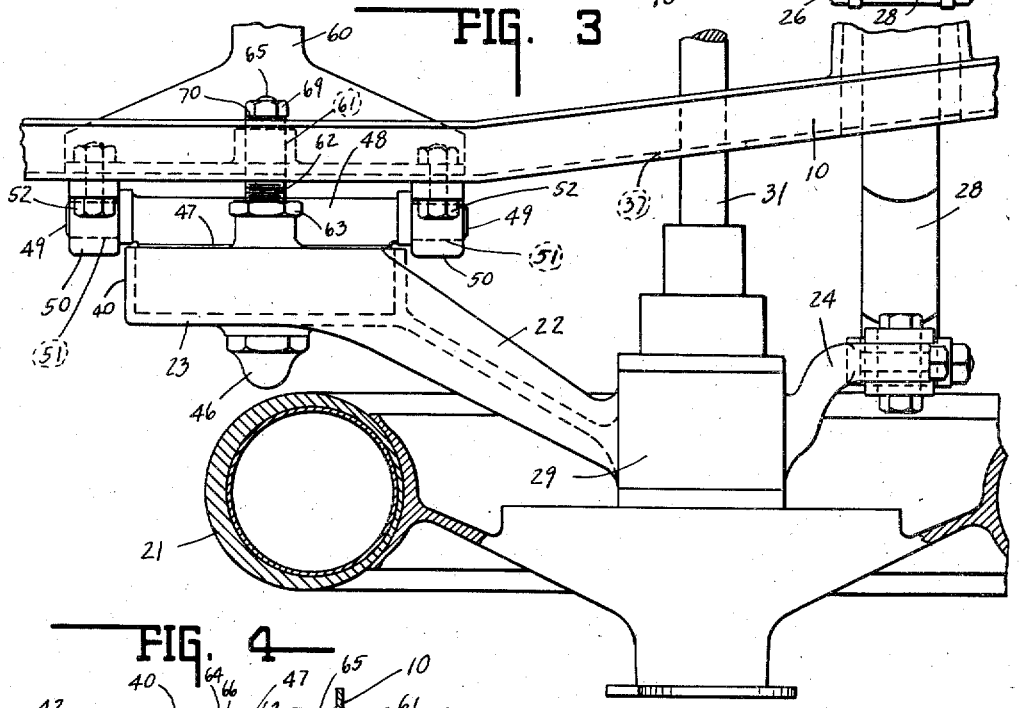
Fig. 3 is an enlarged top plan view of the same.

The rearward wheels of the vehicle are indicated by the numeral 21 and the arms 22 trailingly support the driving wheels with respect to the axis of the pivotal support of the lever arm upon the frame. As beforementioned, the support for the lever arm is of adjustable character and is similar to that beforementioned with respect to the end of the forward arm 12 and is more specifically disclosed in Figs. 2 and 3 and especially in Fig. 4.

The rearward wheels 21 are rotatably supported in the enlargement 29 through which extends the driving axle 31, in turn driven through the differential mechanism housed as at 32 and the drive shaft within the tube 33. A transverse spring 28 is suitably secured at its midportion as at 34 to the frame. The end 24 of the arm 21 is connected to the adjacent end of the spring 28 by interconnected links 25 and 35, the axis 26 being transverse to the axis 27, the two links being connected together as at 36. The frame is shown slotted as at 37 and for convenience is shown elongated and more or less arcuate. This is to permit the arm 22 to oscillate with the shaft relative to the frame 10 and without interference therefrom.

The supported portions 13 and 23 of the levers which extend rearwardly and outwardly from said supported portions for independent wheel suspension, include a substantially cylindrical housing 40. Mounted within the same is a friction brake shoe construction 41 having friction lining 42 thereon. The housing 40 has a plate portion 23 and a central support 43 is apertured as at 44 to receive a pivot member in the form of a bolt 45 capped by an ornamental nut 46.

The bolt 45 is carried by a plate 47 which has formed integral therewith an elongated portion 48 that terminates in two aligned trunnions 49 which are oppositely directed. These trunnions are each supported by a bearing block 50 having the aperture 51 therein that receives the trunnion. Each block is secured to the frame in any conventional manner and herein two bolts 52 are illustrated. With the aforesaid construction, plate 47 is pivoted upon an axis coaxial with the trunnions 49 and which is transverse to the axis of the lever pivot 45 and the two intersect.

Herein the reenforcement 60 of the frame includes a pair of substantially vertically aligned openings 61 which are threaded and each receives an externally threaded adjusting sleeve 62 that terminates in a tool engageable and bearing head 63. This sleeve is hollow and the plate 47 is socketed or recessed as at 64. A bolt 65 having the head portion 66 is seated in the socket portion 64 and extends through the plate 47 as at 67. The threaded end 68 of said bolt 65 mounts a nut 69 that bears on the end 70 of the threaded sleeve.

The camber of the wheel is adjusted by loosening or removing nut 69 and moving one of the threaded sleeves inwardly relative to the frame and the other outwardly until the plane of the plate 47 is at an angle to the vertical corresponding to the camber desired. Thereupon the nuts 69 are replaced or threaded home which draws the plate 47 tightly against the bearing heads 63 of the threaded sleeves, the plate in the initial adjustment tilting upon the axis of the trunnions. This provides for adjustable camber for each wheel and the lever mounting provides for independent wheel suspension.

The independent wheel suspension is that each wheel is supported at or near one end of a lever arm, the axis of the supported end of the lever arm being substantially transverse to the longitudinal axis of the frame and associated with the lever arm, at or near the end opposite the supported end, is a spring construction, herein shown in all instances with respect to the modification of the invention shown in Figs. 1 to 4, inclusive, as being of the transverse type since this form of the invention is more adaptable to transverse spring association, although it may well be associated with longitudinal springs, reference being had to the longitudinal axis of the frame or vehicle.

As previously set forth, included within the cylindrical chamber formed by the supported end 23, the cylindrical portion 40 integral therewith and the plate 47, is the shoe construction 41 having the lining 42 associated therewith.

It will be apparent that with reference to the form of the invention shown in Figs. 1 to 4, inclusive. that each wheel is independently mounted relative to the frame so that it is capable of up and down movement with reference to the opposite axially aligned wheel and the wheel support is adjustably mounted to provide for the desired camber.

While the invention has been set forth in considerable detail in the foregoing description and illustrated in considerable detail in the drawings, the aforesaid is to be considered as illustrative and not restrictive in character. The modification illustrated herein, and many others, which will readily suggest themselves to persons skilled in this art, all are considered to be within the broad scope of this invention, reference being had to the appended claims.

The invention claimed is:

1. In an automobile, the combination with a frame, a load spring, and an automobile wheel, of an elongated wheel support structure operatively connected to the load spring at one end, means pivotally supporting, remote from the spring connection, said structure upon an axis substantially parallel to the longitudinal axis of the automobile and upon an axis intersecting the first mentioned axis and approximately transverse to the longitudinal axis of the automobile, said structure extending longitudinally of the automobile, and means securing said elongated structure at its opposite end in adjusted position on the first mentioned axis.

2. In an automobile, the combination with a frame, a load spring, and an automobile wheel, of an elongated wheel support structure operatively connected to the load spring at one end, means pivotally supporting, remote from the spring connection, said structure upon an axis substantially parallel to the longitudinal axis of the automobile and upon an axis intersecting the first mentioned axis and approximately transverse to the longitudinal axis of the automobile, said structure extending longitudinally of the automobile, and means securing said elongated structure at its opposite end in adjusted position on the first mentioned axis, said wheel support structure at its opposite end including a pair of relatively movable members at the axes intersection, said members permitting up and down movement of the wheel relative to the frame.

3. In an automobile, the combination with a frame, load spring means, and a pair of axially aligned automobile wheels, of an elongated wheel support structure at each side of the frame and operatively connected to the spring means at one end, a pivotal support for each of said elongated structures upon said frame and pivotally supporting the opposite end of the elongated structure upon one axis substantially parallel and another axis substantially transverse to the longitudinal axis of the automobile, and means securing each of said structures at said opposite end in adjusted position upon said parallel axis whereby different adjustments are obtainable for each wheel.

4. In an automobile, the combination with a frame, load spring means, and a pair of axially aligned automobile wheels, of an elongated wheel support structure at each side of the frame and operatively connected to the spring means at one end, a pivotal support for each of said elongated structures upon said frame and pivotally supporting the opposite end of the elongated structure upon one axis substantially parallel and another and intersecting axis substantially transverse to the longitudinal axis of the automobile, and means securing each of said structures at said opposite end in adjusted position upon said parallel axis, each of said elongated wheel supporting structures including a pair of relatively movable members at the intersecting axes, said members permitting up and down movement of each wheel relative to the frame and other wheel.

5. Apparatus of the character defined by claim 2, characterized by the addition of means resisting up and down movement for the purpose described.

6. Apparatus of the character defined by claim 4, characterized by the addition of means resisting up and down movement for the purpose described and for each wheel.

7. Apparatus of the character defined by claim 2, characterized by the relatively movable members having an arcuate path of travel.

8. Apparatus of the character defined by claim 2, characterized by the relatively movable members having an arcuate path of travel, one of said relatively movable members consisting of a lever arm adjacent one end of which is supported said wheel and the other end of which is pivotally supported for said arcuate movement.

9. Apparatus of the character defined by claim 1, characterized by the addition of means resisting up and down movement for the purpose described.

10. Apparatus of the character defined by claim 3, characterized by the addition of means for each wheel resisting up and down movement for the purpose described.

11. In an automobile, the combination with a frame, a load spring, and an automobile wheel, of an elongated wheel support structure operatively connected to the load spring at one end, means pivotally supporting, remote from the spring connection, said structure upon an axis substantially parallel to the longitudinal axis of the automobile and upon an axis intersecting the first mentioned axis and approximately transverse to the axis of the automobile, said structure extending longitudinally of the automobile, and means securing said elongated structure in adjusted position relative to the first mentioned axis.

12. In an automobile, the combination with a frame, a pair of oppositely directed load spring means portions, and a pair of automobile wheels substantially axially aligned, of an elongated wheel supporting structure at each side of the frame and for the wheel adjacent thereto, and operatively connected to the outermost ends of the spring means portions, the adjacent portions of the spring means portions being operatively associated with the frame for load support, support means upon said frame for the elongated wheel support structure and remote from the spring means connection to said wheel support structure, said support means supporting the elongated support structure relative the frame upon two intersecting axes, one being substantially longitudinally directed for camber adjustment of the supported wheel, the other being transverse thereto for normal up and down movement of the elongated structure, and means securing a portion of said support means in adjusted position upon the first mentioned axis for camber adjustment.

13. In an automobile, the combination with a frame, load spring means, and a pair of automobile wheels substantially axially aligned, of an elongated wheel supporting structure at each side of the frame and for the wheel adjacent thereto, and operatively connected to the spring means, the spring means being operatively associated with the frame for load support, support means upon said frame for the elongated wheel support structure and remote from the spring means connection to said wheel support structure, said support means supporting the elongated support structure relative the frame upon two intersecting axes, one being substantially longitudinally directed for camber adjustment of the supported wheel, the other being transverse thereto for normal up and down movement of the elongated structure, and means securing a portion of said support means in adjusted position upon the first mentioned axis for camber adjustment.

14. In an automobile, the combination with a frame, transverse load spring means connected thereto, and a pair of automobile wheels substantially aligned adjacent thereto, of a pair of elongated, relatively independent wheel supporting structures, each being interposed between the adjacent wheel and frame and operatively connected to the spring means, aligned support means at each side of the frame, the alignment being approximately transverse to the longitudinal axis of the frame, each support means supporting the adjacent elongated wheel supporting structure and upon two intersecting axes, one being substantially longitudinally directed for camber adjustment of the supported wheel, the other being transverse thereto for normal up and down movement of the elongated structure, and means securing a portion of said support means in adjusted position upon the first mentioned axis for camber adjustment.

15. Apparatus as defined by claim 12, characterized by the addition of means resisting up and down movement for the purpose described and for each wheel.

16. Apparatus as defined by claim 13, charactrized by the addition of means resisting up and down movement for the purpose described and for each wheel.

17. Apparatus as defined by claim 14, characterized by the addition of means resisting up and down movement for the purpose described and for each wheel.

18. Apparatus as defined by claim 11, charactrized by the addition of means resisting up and down movement of the wheel and for the purpose described.

19. In a vehicle, a frame, a pair of aligned ground wheels at opposite sides thereof with the frame therebetween, wheel supporting means for each wheel, spring means operatively interposed between said means and said frame, a pair of elongated means each extending from adjacent a wheel toward the transverse center of the frame and inwardly towards the longitudinal center thereof, means pivotally connecting the inwardly directed end of the elongated means to the frame, the pivotal axes being substantially coincidental and in a plane transverse to the longitudinal axis of the frame, the wheel supporting means for each wheel having connection with the adjacent elongated means, and means associated with the elongated means for camber adjustment.

20. A structure as defined by claim 19, characterized by the wheel supporting means for each wheel being relatively independent of the other for independent wheel suspension.

21. In a vehicle, the combination with a frame, transverse leaf spring means operatively secured thereto and projecting laterally beyond the same and terminating in bearings at the outermost ends, aligned bearing means upon said frame offset longitudinally relative to the plane including the bearings and transverse to the frame longitudinal axis, a wheel assembly, dual means for supporting the wheel assembly, each of the dual means being mounted at one end in one of said bearings and at its opposite end in one of said bearing means permitting up and down action of the wheel assembly, and adjustable means operatively interposed between each supporting means and the frame adjacent the bearing means for adjusting the wheel assembly to true the vehicle wheel to predetermined relative positioning.

FREDERICK E. CLEMONS.